March 26, 1963     H. OETIKER     3,082,498
COMPRESSION BAND
Filed Jan. 6, 1959
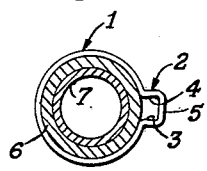
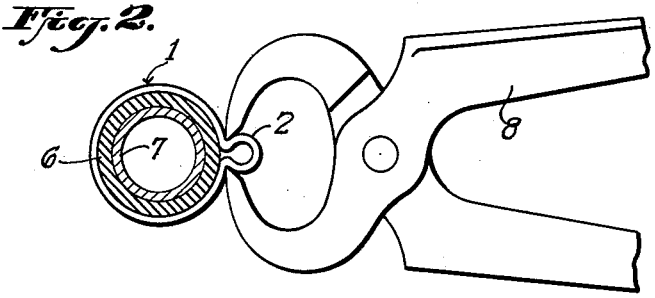
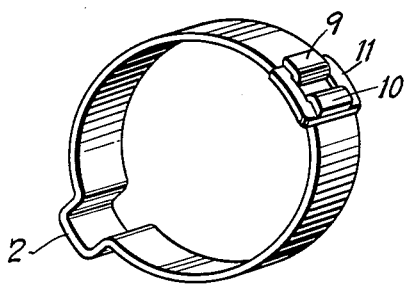
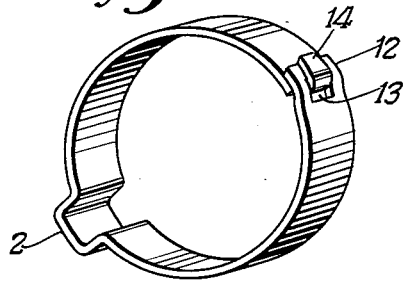
INVENTOR.
BY   HANS OETIKER.
ATTORNEYS.

United States Patent Office 3,082,498
Patented Mar. 26, 1963

3,082,498
COMPRESSION BAND
Hans Oetiker, Oberdorfstrasse 21, Horgen,
Zurich, Switzerland
Filed Jan. 6, 1959, Ser. No. 785,220
7 Claims. (Cl. 24—20)

The present invention relates to an improved compression band for exerting a centripetal compression force on an object around which the band is laid, for example, for pressing a tubular element to an element within the tube.

The hose clamp disclosed in my Patent No. 2,614,304 has several disadvantages. The provision of a plurality of ears which must be compressed for contracting the band increases manufacturing cost as well as the time required for applying the band. When I filed my application which matured into Patent No. 2,614,304 I believed that several regularly distributed compressible ears were required to obtain an even distribution of the centripetal forces produced by the compression band. Since then I have discovered that a satisfactory compression can be produced by providing only one compressible fold or ear, if the band can slide on the object to which the band is applied or if the surface portion of the object can yield in the longitudinal direction of the band, as is the case with most materials of which hoses are made. The connection of hose ends to tubular elements inside the hose ends is a main field of use of my compression band. Synthetic materials, as now widely used, have sufficient gliding quality to afford gliding of the compression band which is needed when only one compression fold is provided.

Another disadvantage of the hose clamp disclosed in my Patent No. 2,614,304 is that the fabrication of a closed ring with folds is costly and that there are many situations in which additional operations are required to apply a closed ring. The present invention provides a compression band which can be made from strip material and is, therefore, less expensive than a closed ring and which can be closed in situ whereby the closure provisions may be more or less completely prefabricated.

The novel features which are considered characteristic of the invention are set forth with particularity in the appended claims. The invention itself, however, and additional objects and advantages thereof will best be understood from the following description of embodiments thereof when read in connection with the accompanying drawing in which:

FIG. 1 shows a compression band according to the invention in plan view ready for being contracted on a hose.

FIG. 2 shows the compression band illustrated in FIG. 1 in contracted position.

FIGS. 3 and 4 are perspective views of two modifications of the compression band according to the invention.

Referring more particularly to FIGS. 1 and 2 of the drawing the uncontracted compression band 1 is in the shape of a ring having an outward fold or ear 2 which has the configuration of an open rectangle or of a U, i.e. it has two spaced substantially parallel sides 3 and 4 and a side 5 which is at a substantially right angle to the sides 3 and 4. In the illustrated application the band is laid around a hose 6 of flexible material which hose must be tightened to a tube 7. Tightening of the band 1 is effected by contracting the parallel sides 3 and 4 of the ear 2 by means of pincers 8 so that the ear or fold assumes a substantially cylindrical shape and has a cross section like the Greek letter Ω (omega).

In the modification of the band according to the invention shown in FIG. 3 the band does not form a closed ring but is open at a point which is substantially diametrically opposite the prefabricated fold 2. The band is closed by pulling its ends 9 and 10 through a buckle 11 and bending the ends backward to be adjacent to the buckle. Thereupon the fold 2 is contracted by pincers in the manner shown in FIG. 2. The band as it comes on the market, has the fold 2 shown in FIG. 3 and may have the ends 9 and 10 in the same plane as the band or these ends may be bent outwardly at a substantially right angle to facilitate insertion in the buckle 11.

In the modification shown in FIG. 4 one end 12 of the band is provided with an aperature 13 through which the other end 14 of the band may be pulled for closing the ring.

Other conventional means for closing a ring may be used without departing from the scope of the present invention. Of course, the free ends of the ring of the compression band may also be connected with each other to thereby close the ring before applying the band to the object over which it is slid in the manner described hereinabove.

Although circular or annular bands are shown in the drawing the bands according to the invention are also suitable to be laid around objects whose circumference is not circular, and is, for example, oval, polygonal or of another regular or irregular configuration.

I claim:

1. A clamp of bendable material for an object which clamp is operative to produce, in the installed condition thereof, a clamping action on said object capable of withstanding relatively high pressures and which is of generally the same shape as the object in the installed condition, said clamp being essentially composed of a band-like material having two ends provided with complementary, mutually engageable interlocking means operable to form a permanent positive lock and an object engaging portion between said ends provided with only a single intermediate offset bendable ear portion projecting outwardly from the object engaging portion of the band, said ear portion including side portions joined by a connecting portion forming a substantially right angle with said side portions, said complementary interlocking means being operable upon mutual interlocking engagement thereof to form a positive lock permanently closing the annulus and substantially snugly fitting the annulus over said object, the ear portion, in said installed condition, being shaped in a convex form with the inner ends of said side portions brought circumferentially toward each other to effect a suce radially inward and circumferential clamping action of said engaging portion on the object.

2. A compression band according to claim 1 in which said object engaging portion includes two portions extending from said ear portion and having substantially the same lengths, said two ends being substantially diametrically opposite said ear portion after the ends are connected.

3. A compression band adapted to be pressed, upon contraction of the band, against an object surrounded by the band and operative to produce a clamping action against said object capable of withstanding relatively high pressures, said band forming initially an open loop having free ends and including means for connecting the free ends of said loop to thereby provide a band snugly fitting to the object which is surrounded by the band, said band being provided with a fold having two spaced substantially parallel portions extending outwards of the loop and substantially normal to the adjacent parts of the band, the outer ends of said portions being connected by a portion placed substantially at a right angle to said substantially parallel portions, the inner ends of said substantially parallel portions which are adjacent to the loop being pressed together for producing said clamping action capable of withstanding said relatively high pressures by contracting and pressing the band against the object which is clampingly surrounded by the band whereby said fold assumes a substantially tubular configuration whose longitudinal axis is substantially parallel to the longitudinal axis of the loop formed by the band.

4. A compression band made of strip material and operative to produce, in the installed contracted condition thereof, a clamping action on a resilient object of uniform diameter surrounded thereby and capable of withstanding relatively high pressures, said object having external surface characteristics enabling relative axial movement between said band and said object during snug engagement of a major part of the circumferential surface portion of said band with said object in the uncontracted condition of said band, said band initially having two free ends and a connection between the free ends rigidly interconnecting the free ends with each other to thereby form a closed ring provided with said surface portion, and said band being of such internal dimension with the free ends rigidly interconnected with each other that said major part of the circumferential surface portion thereof is in relatively snug engagement with said object in the uncontracted condition of said band in which the surface characteristics of said object enable said relative axial movement, the effective part of said band essentially consisting only of said surface portion which is effectively rendered integral by the said connection between said free ends and of exclusively a single fold made of a deformable material, said fold, in the uncontracted condition of said band, having two spaced substantially parallel portions extending at a substantially right angle from the surface portion of said band and a connecting portion which is at a substantially right angle with respect to said parallel portions and which connects said parallel portions, the parts of said parallel portions which are disposed adjacent to said surface portion being pressed together for contracting the band whereby said fold assumes an approximately annular configuration in which the surface portion of said band produces said clamping action.

5. A clamp of bendable material for a hose-like object which clamp is operative to produce, in the installed condition thereof, a clamping action on said object capable of withstanding relatively high pressures and which is of generally annular shape in said installed condition, said clamp being essentially composed of a band-like material having two ends and a tongue portion at one end, there being provided an opening for said tongue portion at the opposite end and an object engaging portion between said ends provided with an intermediate offset bendable ear portion projecting outwardly from the object engaging portion of the band, said ear portion including side portions joined by a connecting portion forming a substantially right angle with said side portions, said tongue portion upon being inserted into said aperature and upon being turned back upon the engaged end being operable to form a lock permanently closing the annulus and substantially snugly fitting the annulus over said object, the ear portion, in said installed condition, being shaped in a convex form with the inner ends of said side portions brought circumferentially toward each other to effect a secure radially inward and circumferential clamping action of said engaging portion on the object.

6. A clamp of bendable material for an object which clamp is operative to produce, in the installed condition thereof, a clamping action on said object capable of withstanding relatively high pressures and which is of generally the same shape as the object in the installed condition, said clamp being essentially composed of a band-like material having two ends provided with complementary, mutually engageable interlocking means operable to form a permanent positive lock and an object engaging portion between said ends provided with an intermediate offset bendable ear portion projecting outwardly from the object engaging portion of the band, said ear portion including side portions joined by a connecting portion forming a substantially right angle with said side portions, said complementary interlocking means being operable upon mutual interlocking engagement thereof to form a postive lock permanently closing the annulus and substantially snugly fitting the annulus over said object, the ear portion, in said installed condition, being shaped in a convex form with the inner ends of said side portions brought circumferentially toward each other to effect a secure radially inward and circumferential clamping action of said engaging portion on the object.

7. A clamp of bendable material for a hose-like object which clamp is operative to produce, in the installed condition thereof, a clamping action on said object capable of withstanding relatively high pressures and which is of generally annular shape in said installed condition, said clamp being essentially composed of a band-like material having a tongue portion at one end, there being provided an opening for said tongue portion at the opposite end and an object engaging portion between said ends provided with only a single intermediate offset bendable ear portion projecting outwardly from the object engaging portion of the band, said ear portion including side portions joined by a connecting portion forming a substantially right angle with said side portions, said tongue portion upon being inserted into said aperture and upon being turned back upon the engaged end being operable to form a lock permanently closing the annulus and substantially snugly fitting the annulus over said object, the ear portion, in said installed condition, being shaped in a convex form with the inner ends of said side portions brought circumferentially toward each other to effect a secure radially inward and circumferential clamping action of said engaging portion on the object.

References Cited in the file of this patent

UNITED STATES PATENTS

| | | |
|---|---|---|
| 142,894 | Brodie | Sept. 16, 1873 |
| 294,937 | Towle | Mar. 11, 1884 |
| 1,084,936 | Forbes | Jan. 20, 1914 |
| 1,379,476 | Parr | May 24, 1921 |
| 2,614,304 | Oetiker | Oct. 21, 1952 |

FOREIGN PATENTS

| | | |
|---|---|---|
| 280,288 | Great Britain | of 1927 |